United States Patent [19]

Murata et al.

[11] Patent Number: 5,750,631
[45] Date of Patent: May 12, 1998

[54] HALOGENATED EPOXY RESIN, PRODUCTION OF SAID RESIN, FLAME RETARDANT, AND FLAME-RETARDED EPOXY RESIN COMPOSITION

[75] Inventors: Yasuyuki Murata; Yoshinori Nakanishi, both of Yokkaichi, Japan

[73] Assignee: Shell Oil Company, Houston, Tex.

[21] Appl. No.: 672,433

[22] Filed: Jun. 28, 1996

[30] Foreign Application Priority Data

Jun. 29, 1995 [JP] Japan ................... 7-184984

[51] Int. Cl.$^6$ .................................................. C08G 8/28
[52] U.S. Cl. .................. 528/98; 528/102; 525/481; 525/482; 525/484; 525/507; 523/443; 523/466; 549/559
[58] Field of Search .................... 525/481, 482, 525/484, 507; 523/443, 466; 549/559; 528/98, 102

[56] References Cited

U.S. PATENT DOCUMENTS

| | | | |
|---|---|---|---|
| 4,390,664 | 6/1983 | Kanayama et al. | 525/117 |
| 4,394,496 | 7/1983 | Schrader | 528/98 |
| 5,077,375 | 12/1991 | Saito et al. | 528/98 |
| 5,185,388 | 2/1993 | Murata et al. | 523/466 |

FOREIGN PATENT DOCUMENTS

| | | |
|---|---|---|
| 48-025100 | 4/1973 | Japan. |
| 3-157417 | 7/1991 | Japan. |

*Primary Examiner*—Frederick Krass

[57] ABSTRACT

The present invention relates to an epoxy composition represented by the formula (I) below, wherein G is a glycidyl group or a halogen atom. It is produced by reacting a halogenated polyhydric phenol compound with epihalohydrin in the presence of an alkali metal hydroxide. It is incorporated into a resin to render it flame retardant.

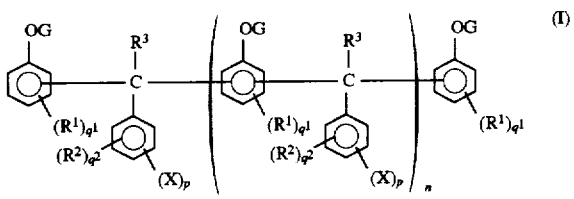

(I)

13 Claims, No Drawings

HALOGENATED EPOXY RESIN, PRODUCTION OF SAID RESIN, FLAME RETARDANT, AND FLAME-RETARDED EPOXY RESIN COMPOSITION

FIELD OF THE INVENTION

The present invention relates to a halogenated epoxy resin which is superior in thermal stability and useful as a flame retardant for various resins, a process for producing said resin, and a flame-retarded epoxy resin composition containing said resin.

BACKGROUND OF THE INVENTION

Flame retardancy of polymeric materials is such an important subject that it is stipulated in JIS standards, automotive product standards, electric product standards, and UL standards.

There are a variety of flame retardants for polymeric materials. Typical examples include halogenated compounds such as chlorinated and brominated compounds, of which halogenated phenol compounds and halogenated epoxy resins are desirable because of their good compatibility with and reactivity toward base resins, with no adverse effect on the properties of base resins. They are in general use as a flame retardant for a variety of synthetic resins, such as epoxy resins, phenolic resins, polystyrene resins, and ABS resins. However, commercial halogenated epoxy resins, which are obtained by reaction of tetrabromobisphenol A, brominated phenol novolak resin, or similar halogenated phenol compound with epihalohydrin, suffers a disadvantage of giving off a large amount of hydrogen halide and halogen gas upon their thermal decomposition because of their low thermal decomposition temperature (230°–250° C.). The thermal decomposition takes place when the halogenated compound (as a flame retardant) is mixed with a base resin, when the resulting resin composition is molded, or when the molded resin is used. The evolution of halogen-containing gas causes discoloration and degradation of the resin before and after molding and also causes corrosion of molding equipment and metal parts in contact with the molded items.

Ceramics or metals for encapsulation of semiconductor elements such as IC or LSI are being replaced by a molding material of thermosetting resin for cost reduction. A typical example of the resin molding material for encapsulation is an epoxy resin for low-pressure molding. Flame retardancy is also required of such an epoxy resin composition.

Resin compositions for encapsulation must meet stringent requirements for reliability, especially that which depends on moisture resistance. Moisture resistance greatly depends on the composition of the resin, especially on ionic impurities present in the resin. Ionic impurities attack aluminum wires under moist conditions. Examples of ionic impurities include sodium ions, chlorine ions, and bromine ions. The recent advance in preparation and purification of raw materials makes it possible to reduce the amount of sodium ions and chlorine ions in the base resin to such a low level that they hardly pose a problem with reliability. However, there still exists a problem in the above-mentioned brominated epoxy resin (as a conventional halogen-based flame retardant) which is produced by reaction of tetrabromobisphenol A, brominated phenol novolak resin, or similar brominated phenol compound with epihalohydrin. It is poor in stability and subject to decomposition by heating at the time of molding or soldering. Upon decomposition, it gives off bromine ions.

Japanese Patent Laid-Open No. 157417/1991 discloses a heatstable brominated epoxy resin which is produced from brominated polycarbonate oligomer. This epoxy resin, however, is not satisfactory in thermal stability.

Thus, it is desirable to provide a halogenated epoxy compound which is superior in thermal stability and useful as a flame retardant for a variety of resins. It is further desirable to provide a flame-retarded epoxy resin composition which is characterized by the evolution of less hydrogen halide gas at the time of heating.

SUMMARY OF THE INVENTION

Accordingly a halogenated epoxy composition represented by the formula (I) below is provided.

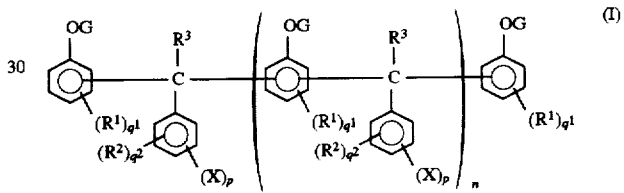

wherein G is a glycidyl group; each X independently is a chlorine or bromine atom; each $R^1$ independently is a hydroxyl group, $C_{1-10}$ alkyl group, substituted or unsubstituted phenyl group, substituted or unsubstituted aralkyl group, alkoxy group, or halogen atom, preferably a methyl group; each $R^2$ independently is a hydroxyl group, $C_{1-10}$ alkyl group, substituted or unsubstituted phenyl group, substituted or unsubstituted aralkyl group, or alkoxy group; each $R^3$ independently is a hydrogen atom, $C_{1-10}$ alkyl group, substituted or unsubstituted phenyl group, or substituted or unsubstituted aralkyl group, preferably a hydrogen atom; each p independently is an integer of 1 to 5, preferably 1 or 2; each $q^1$ independently is an integer of 0 to 4, preferably 0 to 2; each $q^2$ independently is an integer of 0 to 4 provided $1 \leq p+q^2 \leq 5$, preferably 0; and n is a number of 0 to 5 on average.

Further, a process for producing the halogenated epoxy composition is provided comprising reacting a halogenated polyhydric phenol compound represented by the formula (II) below with an epihalohydrin in the presence of an alkali metal hydroxide.

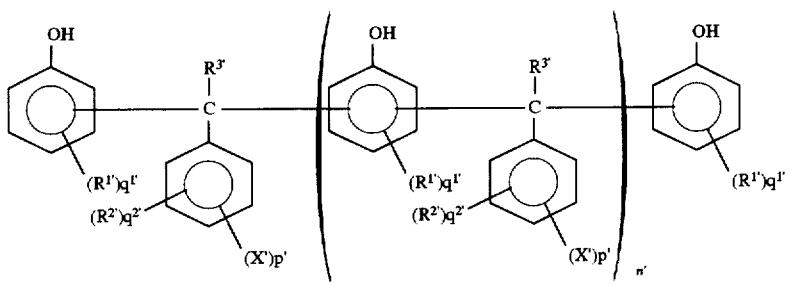

(II)

wherein each X' independently is a chlorine or bromine atom; each $R^{1\prime}$ independently is a hydroxyl group, $C_{1-10}$ alkyl group, substituted or unsubstituted phenyl group, substituted or unsubstituted aralkyl group, alkoxy group, or halogen atom, preferably methyl group; each $R^{2\prime}$ independently is a hydroxyl group, $C_{1-10}$ alkyl group, substituted or unsubstituted phenyl group, substituted or unsubstituted aralkyl group, or alkoxy group; each $R^{3\prime}$ independently is a hydrogen atom, $C_{1-10}$ alkyl group, substituted or unsubstituted phenyl group, or substituted or unsubstituted aralkyl group, preferably a hydrogen atom; each p' independently is an integer of 1 to 5, preferably 1 or 2; each $q^{1\prime}$ independently is an integer of 0 to 4, preferably 0 to 2; each $q^{2\prime}$ independently is an integer of 0 to 4, preferably 0; and n' is a number of 0 to 5 on average.

DETAILED DESCRIPTION OF THE INVENTION

The present invention provides a halogenated epoxy composition (resin) and a process for producing the same. According to the present invention, the halogenated epoxy composition is produced by condensation reaction of a halogenated polyhydric phenol composition represented by the formula (II) above with epihalohydrin in the presence of an alkali metal hydroxide.

The halogenated polyhydric phenol composition as a starting material can be produced by condensation reaction of a phenolic compound with a chlorinated aromatic aldehyde, brominated aromatic aldehyde, chlorinated aromatic ketone, and/or brominated aromatic ketone.

The phenolic compound used for production of the starting material is a compound represented by the formula (III) below

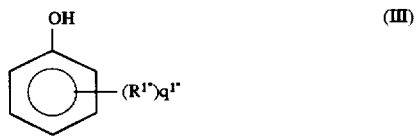

(III)

wherein each $R^{1\prime\prime}$ independently is a hydroxyl group, $C_{1-10}$ alkyl group, substituted or unsubstituted phenyl group, substituted or unsubstituted aralkyl group, alkoxy group, or halogen atom; and each $q^{1\prime\prime}$ is an integer of 0 to 4.

Examples of the phenolic compound include phenol, cresol, xylenol, propylphenol, butylphenol, phenylphenol, cumylphenol, methoxyphenol, chlorophenol, bromophenol, bisphenol A, bisphenol F, bisphenol AD, hydroquinone, resorcin, methylresorcin, and biphenol.

Examples of the chlorinated aromatic aldehyde, brominated aromatic aldehyde, chlorinated aromatic ketone, and brominated aromatic ketone, which can be used for condensation reaction with a phenolic compound, include those compounds represented by the formula (IV) below

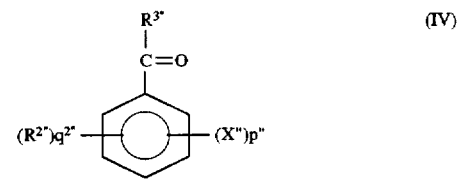

(IV)

wherein each X" independently is a chlorine or bromine atom; each $R^{2\prime\prime}$ independently is a hydroxyl group, $C_{1-10}$ alkyl group, substituted or unsubstituted phenyl group, substituted or unsubstituted aralkyl group, or alkoxy group; $R^{3\prime\prime}$ is a hydroxyl group, $C_{1-10}$ alkyl group, substituted or unsubstituted phenyl group, or substituted or unsubstituted aralkyl group; each p" is an integer of 1 to 5; and each $q^{2\prime\prime}$ is an integer of 0 to 4.

Examples of the chlorinated aromatic aldehyde, brominated aromatic aldehyde, chlorinated aromatic ketone, and brominated aromatic ketone include monochlorobenzaldehyde, dichlorobenzaldehyde, trichlorobenzaldehyde, monobromobenzaldehyde, dibromobenzaldehyde, tribromobenzaldehyde, methylmonochlorobenzaldehyde, methyldichlorobenzaldehyde, methylmonobromobenzaldehyde, methyldibromobenzaldehyde, dihydroxymonochlorobenzaldehyde, hydroxydichlorobenzaldehyde, hydroxymonobromobenzaldehyde, hydroxydibromobenzaldehyde, monochloroacetophenone, dichloroacetophenone, trichloroacetophenone, monobromoacetophenone, dibromoacetophenone, tribromoacetophenone, monochlorobenzophenone, dichlorobenzophenone, trichlorobenzophenone, monobromobenzophenone, dibromobenzophenone, and tribromobenzophenone.

The condensation reaction should be carried out such that 1 mol of the phenolic compound is used for 0.1–1.0 mol, preferably 0.2–0.8 mol, of an aldehyde or ketone (e.g., the chlorinated aromatic aldehyde, brominated aromatic aldehyde, chlorinated aromatic ketone, and/or brominated aromatic ketone). This ratio should be properly adjusted according to the intended use.

The condensation reaction may be carried out under the same conditions as used for the production of novolak. That is, it may be carried out at 20°–200° C. for 1–20 hours in the presence of an acid catalyst such as hydrochloric acid, sulfuric acid, oxalic acid, toluenesulfonic acid, and H-type ion exchange resin.

One or more than one species of the halogenated polyhydric phenol compound (halogenated polyhydric phenol composition) obtained as mentioned above is reacted with epihalohydrin in the presence of an alkali metal hydroxide to give the halogenated epoxy composition specified in the present invention.

A typical example of the reaction is described below in detail. First, a halogenated polyhydric phenol composition is dissolved in as much epihalohydrin as 3–20 mol per mol of phenolic hydroxyl group to give a uniform solution. To this solution is added with stirring as much alkali metal hydroxide (in the form of solid or aqueous solution) as 1–2 mol per mol of phenolic hydroxyl group. This reaction may take place at about 30°–105° C. under normal pressure or at about 30°–80° C. under reduced pressure. During reaction, the reaction liquid may be dehydrated, if necessary, by azeotropic distillation, separation of condensate into oil and water, and return of oil to the reaction system. The alkali metal hydroxide should be added little by little intermittently or continuously over 1–8 hours so as to avoid abrupt reactions. The total reaction time will be about 1–10 hours.

After the reaction is complete, insoluble salts (as by-products) are removed by filtration or water washing and unreacted epihalohydrin is removed by distillation under reduced pressure. Thus there is obtained the desired halogenated epoxy composition.

The epihalohydrin used in this reaction is usually epichlorohydrin or epibromohydrin, and the alkali metal hydroxide used in this reaction is usually NaOH or KOH.

This reaction may be accelerated by a catalyst whose examples include quaternary ammonium salts (such as tetramethyl ammonium chloride and tetraethylammonium bromide), tertiary amines (such as benzyldimethylamine and 2,4,6-tris(dimethylaminomethyl)phenol), imidazoles (such as 2-ethyl-4-methylimidazole and 2-phenylimidazole), phosphonium salts (such as ethyltriphenylphosphonium iodide), and phosphines (such as triphenylphosphine).

This reaction may be carried out in an inert organic solvent whose examples include alcohols (such as ethanol and isopropanol), ketones (such as acetone and methyl ethyl ketone), ethers (such as dioxane and ethylene glycol dimethyl ether), and aprotic solvents (such as dimethylsulfoxide and dimethylformamide).

The epoxy composition obtained as mentioned above should be purified as follows if it contains saponifiable halogen excessively. (This step is necessary to give a purified epoxy resin containing saponifiable halogen at a sufficiently low level.) First, the crude product is dissolved again in an inert organic solvent such as isopropanol, methyl ethyl ketone, methyl isobutyl ketone, toluene, xylene, dioxane, propylene glycol monomethyl ether, and dimethylsulfoxide. The solution is kept at about 30°–120° C. for 0.5–8 hours in the presence of alkali metal hydroxide (added in the form of solid or aqueous solution) for reaction to close the ring again. The solution is washed with water to remove excess alkali metal hydroxide and salts (by-products) and is freed of solvent by vacuum distillation. In this way there is obtained a purified halogenated epoxy composition.

Preferable among many halogenated epoxy compositions is the one which is obtained by reaction of a halogenated polyhydric phenol with epihalohydrin, the former being obtained by reaction of phenolic compound (which is one or more than one species selected from readily available phenol, cresol, and xylenol) with benzaldehyde derivative (which is one or more than one species selected from monochlorobenzaldehyde, dichlorobenzaldehyde, trichlorobenzaldehyde, monobromobenzaldehyde, dibromobenzaldehyde, and tribromobenzaldehyde).

The flame-retarded epoxy resin composition of the present invention contains (a) an epoxy resin and (b) a curing agent. All or part of the epoxy resin (a) may be the halogenated epoxy composition of the present invention which is used as an epoxy resin and a flame retardant.

The epoxy resin to be used in combination with the halogenated epoxy composition of the present invention is not specifically restricted; it includes ordinary epoxy resins which are listed below.

- Epoxy resins produced from a phenolic compound and epihalohydrin.
- Epoxy resins produced from an amine compound and epihalohydrin.
- Epoxy resins produced from a carboxylic acid and epihalohydrin.

Examples of the phenolic compound include bisphenol A, bisphenol F, bisphenol AD, tetramethylbisphenol F, hydroquinone, methyl hydroquinone, dimethylhydroquinone, dibutylhydroquinone, resorcin, methylresorcin, biphenol, tetramethylbiphenol, dihydroxynaphthalene, dihydroxydiphenyl ether, phenol novolak resin, cresol novolak resin, bisphenol A novolak resin, dicyclopentadiene phenolic resin, terpene phenolic resin, phenolaralkyl resin, and naphthol novolak resin. Examples of the phenolic compound also include polyhydric phenolic resins obtained by condensation reaction of a phenolic compound with an aldehyde such as hydroxybenzaldehyde, crotonaldehyde, and glyoxal. Examples of the amine compound include diaminodiphenylmethane, aminophenol, and xylenediamine. Examples of the carboxylic acid include methylhexahydrophthalic acid and dimer acid.

The flame-retarded epoxy resin composition of the present invention contains a curing agent (b). The curing agent (b) is not specifically restricted; any of common epoxy resin curing agent may be used. Examples of the curing agent are listed below.

- Phenolic compounds such as bisphenol A, bisphenol F, bisphenol AD, hydroquinone, resorcin, methylresorcin, biphenol, tetramethylbiphenol, dihydroxynaphthalene, dihydroxydiphenyl ether, phenol novolak resin, cresol novolak resin, bisphenol A novolak resin, dicyclopentadiene phenolic resin, terpene phenolic resin, phenolaralkyl resin, naphthol novolak resin, brominated bisphenol A, and brominated phenol novolak resin.
- Polyhydric phenolic resins which are obtained by condensation reaction of a phenolic compound with an aldehyde (such as hydroxybenzaldehyde, crotonaldehyde, and glyoxal).
- Active ester compounds which are obtained from phenolic compounds or phenolic resins by total or partial esterification (or by converting the phenolic hydroxyl groups into benzoate or acetate).
- Acid anhydrides such as methyltetrahydrophthalic anhydride, hexahydrophthalic anhydride, pyromellitic anhydride, and methyl nadic anhydride.
- Amines such as diethylenetriamine, isophoronediamine, diaminodiphenylmethane, diaminodiphenylsulfone, and dicyandiamide.

The flame-retarded epoxy resin composition of the present invention contains the curing agent (b) in such an amount that those groups in the curing agent which are reactive to epoxy groups amount to 0.5–2.0 mol in total, preferably 0.7–1.2 mol in total, per mol of epoxy groups in the entire epoxy resin.

The ratio of the halogenated epoxy compositions in the epoxy resin (a) should be such that the resin composition contains halogen enough for it to exhibit desired flame retardancy.

The adequate halogen concentration greatly varies depending on the degree of flame retardance required, the kind of resin components, and the presence or absence or the amount of flame retardant auxiliary and inorganic filler. Usually it is 1–20 wt % of all the organic ingredients in the composition.

The flame-retarded epoxy resin composition of the present invention may contain a variety of additives, as in the case of ordinary epoxy resin compositions. Such additives include cure accelerator, filler, coupling agent, flame retardant auxiliary, plasticizer, solvent, reactive diluent, and pigment. They are used as the occasion may demand.

The flame-retarded epoxy resin composition of the present invention may be advantageously used for encapsulation, casting, adhesion, and molding because it hardly gives off hydrogen halide gas when it is heated. It is especially useful for encapsulating or packaging semiconductor integrated circuits which are subject to corrosion by halogen ions.

When used for encapsulation of semiconductors, the flame-retarded epoxy resin composition of the present invention should be composed of (a) an epoxy resin, (b) a curing agent, (c) an inorganic filler, and (d) a cure accelerator.

Examples of the inorganic filler (c) include, for example, fused silica, crystalline silica, glass powder, alumina, and calcium carbonate, in crushed form or spherical form. They may be used alone or in combination with one another. Fused silica and crystalline silica are desirable. The amount of the inorganic filler should be 60–95 wt %, preferably 75–93 wt %, of the entire composition.

Examples of the cure accelerator (d) include phosphine compounds (such as tributylphosphine, triphenylphosphine, tris(dimethoxyphenyl)phosphine, tris(hydroxypropyl)phosphine, and tris(cyanoethyl)phosphine), phosphonium salts (such as tetraphenylphosphoniumtetraphenylborate, methyltributylphosphoniumtetraphenylborate, and methyltricyanoethylphosphonium tetraphenylborate), imidazoles (such as 2-methylimidazole, 2-phenylimidazole, 2-ethyl-4-methylimidazole, 2-undecylimidazole, 1-cyanoethyl-2-methylimidazole,2,4-dicyano-6-[2-methylimidazolyl-(1)]-ethyl-s-triazine,and 2,4-dicyano-6-[2-undecylimidazolyl-(1)]-ethyl-s-triazine), imidazolium salts (such as 1-cyanoethyl-2-undecylimidazolium trimellitate, 2-methylimidazolium isocyanurate, 2-ethyl-4-methylimidazolium tetraphenylborate, and 2-ethyl-1,4-dimethylimidazolium tetraphenylborate), amines (such as 2,4,6-tris(dimethylaminomethyl)phenol, benzylmethylamine, tetramethylbutylguanidine, N-methylpiperazine, and 2-dimethylamino-1-pyrroline), ammonium salts (such as triethylammonium tetraphenylborate), diazabicyclo compounds (such as 1,5-diazabicyclo(5.4.0)-7-undecene, 1,5-diazabicyclo(4.3.0)-5-nonene, and 1,4-diazabicyclo(2.2.2)-octane), and salts of diazabicyclo compounds (such as tetraphenylborate, phenol salt, pheonolnovolak salt, and 2-ethylhexanoic acid salt).

Preferable among these cure accelerators are phosphine compounds, imidazole compounds, and diazabicyclo compounds and salts thereof.

The cure accelerators (d) may be used alone or in combination with one another. They should be used in an amount of 0.1–7 wt %, preferably 0.5–3 wt %, of the epoxy resin (a).

The epoxy resin (a) should be entirely or partly the halogenated epoxy compound of the present invention.

The flame retardant auxiliary may be antimony trioxide or phosphoric acid, for example. It should be used in such an amount that halogen accounts for 1–5 wt % of the total organic ingredients in the composition. The amount of the halogenated epoxy compound of the present invention in the epoxy resin (a) should be properly adjusted accordingly.

EXAMPLES

The present invention will be described in more detail with reference to the following non-limiting preliminary examples, examples, and comparative examples which cover the production of the halogenated polyhydric phenol compounds, the production of the halogenated epoxy compositions of the present invention, and the flame-retarded epoxy resin compositions of the present invention.

PRELIMINARY EXAMPLES 1 TO 3

(Production of halogenated polyhydric phenol compounds)

A 3-liter three-mouth flask equipped with a thermometer, stirrer, and condenser was charged with phenol or cresol (as a phenolic compound), 3-bromobenzaldehyde, 2,3-dibromobenzaldehyde, or 2,4-dichlorobenzaldehyde (as a chlorinated or brominated aromatic aldehyde), and paratoluenesulfonic acid (as an acid catalyst) in varied amounts as shown in Table 1. The whole assembly was kept at 100° C. for 5 hours for reaction. To the flask was added 1000 g of methyl isobutyl ketone to completely dissolve the reaction product. The solution was washed with water to remove the catalyst and was freed of unreacted phenol or cresol and methyl isobutyl ketone by vacuum distillation. Thus there was obtained the desired halogenated polyhydric phenol compound.

Table 1 shows the bromine or chlorine content, hydroxyl equivalent, and softening point of the halogenated polyhydric phenol compounds.

TABLE 1

|  |  |  | Example No. | | |
|---|---|---|---|---|---|
|  |  |  | 1 | 2 | 3 |
| Reactants | Phenolic compound | Kind | A | A | B |
|  |  | Amount (g) | 282 | 282 | 324 |
|  | Halogenated aromatic aldehyde | Kind | C | D | E |
|  |  | Amount (g) | 240 | 240 | 263 |
|  | Paratoluenesulfonic acid | Amount (g) | 1.4 | 1.4 | 1.6 |
| Analytical data | Chlorine content (wt %) |  | — | 24.0 | 22.1 |
|  | Bromine content (wt %) |  | 24.8 | — | — |
|  | Hydroxyl equivalent (g/eq.) |  | 208 | 187 | 203 |
|  | Softening point (°C.) |  | 78 | 81 | 89 |

Remarks:
A: Phenol
B: o-Cresol
C: 3-Bromobenzaldehyde
D: 2,3-dibromobenzaldehyde
E: 2,4-dichlorobenzaldehyde

EXAMPLES 1 TO 3

(Production of halogenated epoxy compounds)

A 3-liter three-mouth flask equipped with a thermometer, stirrer, and condenser was charged with each of the halogenated polyhydric phenol compounds obtained in Preliminary Examples 1 to 3, epichlorohydrin, and isopropyl alcohol in varied amounts as shown in Table 2. The whole assembly was heated to 35° C. for uniform dissolution. To the solution was added dropwise over 1 hour 100 g of 48.5 wt % aqueous solution of sodium hydroxide, with gradual heating such that the temperature of the reaction system reached 65° C. when dropping was complete. The reaction system was kept at 65° C. for 30 minutes to complete reaction. The reaction product was washed with water to remove salts (by-products) and excess sodium hydroxide. Then the reaction product was freed of excess epichlorohydrin and isopropyl alcohol by vacuum distillation. Thus there was obtained a crude epoxy resin.

The crude epoxy resin was dissolved in 500 g of methyl isobutyl ketone. To the solution was added 5 g of 48.5 wt % aqueous solution of sodium hydroxide, and reaction was carried out at 65° C. for 1 hour. When the reaction was complete, excess sodium hydroxide was neutralized with sodium primary phosphate and the resulting salt (by-product) was removed by washing with water. The reaction product was completely freed of methyl isobutyl ketone by vacuum distillation. Thus there was obtained the desired halogenated epoxy compound.

Table 2 shows the bromine or chlorine content, epoxy equivalent, and softening point of the halogenated epoxy compounds.

No. 157417/1991), epoxy resin derived from tetramethylbiphenol, or o-cresol novolak type epoxy resin.

- (b) Hardener: phenol novolak resin
- (c) Inorganic filler: fused silica powder
- (d) Cure accelerator: triphenylphosphine
- Flame retardant auxiliary: antimony trioxide
- Surface treatment for filler: epoxysilane
- Mold release: carnauba wax Each composition underwent melt-mixing at 90°–130° C. for 5 minutes by a mixing roll. The resulting melt-mixture was formed into sheet, which was subsequently crushed into a molding material.

Each molding material was molded into a test piece using a low-pressure transfer molding machine, with the mold temperature being 180° C. and the molding cycle being 180

TABLE 2

|  |  |  | Example 1 | Example 2 | Example 3 |
|---|---|---|---|---|---|
| Reactants | Halogenated poly-hydric phenol compound | Kind | Pre. Example 1 | Pre. Example 2 | Pre. Example 3 |
|  |  | Amount (g) | 208 | 187 | 203 |
|  | Epichlorohydrin | Amount (g) | 370 | 370 | 462 |
|  | Isopropyl alcohol | Amount (g) | 120 | 120 | 150 |
| Analytical data | Chlorine content (wt %) |  | — | 16.9 | 15.9 |
|  | Bromine content (wt %) |  | 17.8 | — | — |
|  | Hydroxyl equivalent (g/eq.) |  | 289 | 265 | 286 |
|  | Softening point (°C.) |  | 60 | 62 | 70 |

EXAMPLES 4 TO 7 AND COMPARATIVE EXAMPLES 1 TO 3

(Production of flame-retarded epoxy resin compositions)

Flame-retarded epoxy resin compositions for semiconductor encapsulation were prepared from the following ingredients according to the formulation shown in Table 3.

- (a) Epoxy resin: each of the halogenated epoxy compounds obtained in Preliminary Examples 1 to 3, brominated bisphenol A type epoxy resin, brominated epoxy resin (disclosed in Japanese Patent Laid-open seconds. The molded test piece underwent post curing at 180° C. for 8 hours.

The post-cured test piece was tested for glass transition point, extractable halogen, and flame retardancy. The results are shown in Table 3. It is noted that the samples in Examples 4 to 7 are comparable in flame retardancy, with a less amount of extractable halogen, to those in Comparative Examples 1 and 2 which are incorporated with a conventional flame retardant. It is also noted that the sample in Comparative Example 3, which is not incorporated with a flame retardant, lacks flame retardance although it contains a less amount of extractable halogen.

TABLE 3

|  |  | Ex. 4 | Ex. 5 | Ex. 6 | Ex. 7 | Comp. Ex. 1 | Comp. Ex. 2 | Comp. Ex. 3 |
|---|---|---|---|---|---|---|---|---|
| Formulation (pbw) | (a) Epoxy resin (kind) | Pre. Ex. 1 | Pre. Ex. 2 | Pre. Ex. 3 | Pre. Ex. 1 | F | G | H |
|  | Amount | 27 | 28 | 30 | 26 | 10 | 25 | 100 |
|  | Epoxy resin (kind) | H | H | H | I | H | H | — |
|  | Amount | 73 | 72 | 70 | 74 | 90 | 75 | — |
|  | (b) Curing Agent *1 | 49 | 49 | 48 | 46 | 51 | 48 | 53 |
|  | (c) Inorganic filler *2 | 447 | 447 | 444 | 438 | 453 | 444 | 459 |
|  | (d) Cure accelerator *3 | 1 | 1 | 1 | 1 | 1 | 1 | 1 |
|  | Flame retardant auxiliary *4 | 10 | 10 | 10 | 10 | 10 | 10 |  |
|  | Mold release *5 | 1 | 1 | 1 | 1 | 1 | 1 | 1 |
|  | Coupling agent *6 | 1 | 1 | 1 | 1 | 1 | 1 | 1 |
| Physical properties of cured product | Glass transition point (°C.) *7 | 144 | 147 | 139 | 157 | 133 | 130 | 134 |
|  | Extractable halogen Cl$^-$ (ppm) *8 | 7 | 12 | 11 | 6 | 8 | 6 | 6 |
|  | Extractable halogen Br$^-$ (ppm) | 9 | <1 | <1 | 7 | 225 | 104 | <1 |
|  | Flame retardancy *9 | V-0 | V-0 | V-0 | V-0 | V-0 | V-0 | HB |

Note to Table 3
F: Brominated bisphenol A type epoxy resin ("Epikote 5050", from Yuka Shell Epoxy K.K., epoxy equivalent: 385, bromine content: 49%)

TABLE 3-continued

|  | Ex. 4 | Ex. 5 | Ex. 6 | Ex. 7 | Comp. Ex. 1 | Comp. Ex. 2 | Comp. Ex. 3 |
|---|---|---|---|---|---|---|---|

G: Brominated epoxy resin disclosed in Japanese Patent Laid-Open No. 157417/1991 (epoxy equivalent: 330, bromine content: 19%)
H: Epoxy resin derived from tetramethylbiphenol ("Epikote YX4000H", from Yuka Shell Epoxy K.K., epoxy equivalent: 193)
I: o-Cresol novolak type epoxy resin ("Epikote 180H65", from Yuka Shell Epoxy K.K., epoxy equivalent: 205)
*[1]: Phenol novolak resin (from Gun-ei Kagaku Co., Ltd., softening point: 85° C.)
*[2]: Silica powder ("RD-8", from Tatsumori Co., Ltd.)
*[3]: Triphenylphosphine
*[4]: Antimony trioxide
*[5]: Carnauba wax
*[6]: Epoxysilane ("KBM-403", from Shin-Etsu Chemical Co., Ltd.)
*[7]: Obtained from the thermal expansion curve using TMA.
*[8]: Determined by ion chromatography after extraction with hot water at 180° C. for 100 hours.
*[9]: By vertical burning test according to UL94 standard.

As mentioned above, the halogenated epoxy composition of the present invention is superior in thermal stability and is useful as a flame retardant for a variety of resins. A flame-retarded epoxy resin composition incorporated with it gives off only a small amount of hydrogen halide gas at the time of heating and hence finds use in encapsulation, casting, adhesion, and molding, especially encapsulation of semiconductors.

We claim:

1. A halogenated epoxy composition represented by the formula

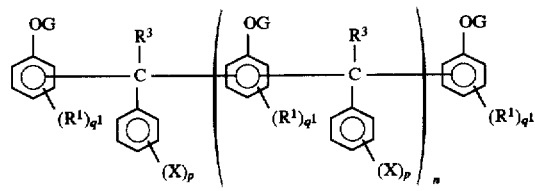

wherein G is a glycidyl group; each X independently is a chlorine or bromine atom; each $R^1$ independently is a hydroxyl group, $C_{1-10}$ alkyl group, phenyl group, aralkyl group, alkoxy group, or halogen atom; each $R^3$ independently is a hydrogen atom, $C_{1-10}$ alkyl group, phenyl group, or aralkyl group; each p independently is an integer of 1 to 5; each $q^1$ independently is an integer of 0 to 4; and n is a number of 0 to 5 on average.

2. A process for producing the halogenated epoxy composition of claim 1, said process comprising reacting (a) a halogenated polyhydric phenol composition represented by formula (II)

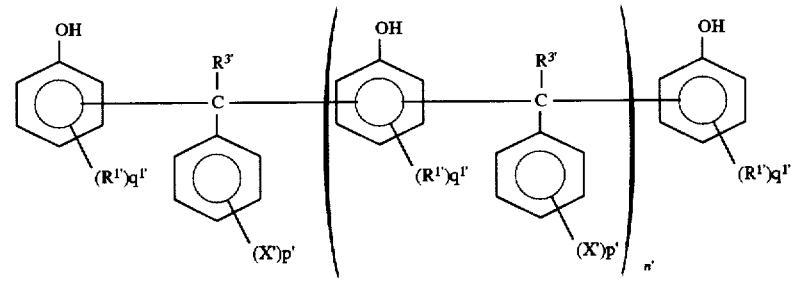

wherein each X' independently is a chlorine or bromine atom; each $R^{1'}$ independently is a hydroxyl group; $C_{1-10}$ alkyl group, phenyl group, aralkyl group, alkoxy group, or halogen atom; each R3 independently is a hydrogen atom, $C_{1-10}$ alkyl group, phenyl group, or aralkyl group; each p' independently is an integer of 1 to 5; each $q^{1'}$ independently is an integer of 0 to 4; and n' is a number of 0 to 5 on average with (b) an epihalohydrin in the presence of (c) an alkali metal hydroxide.

3. The composition of claim 1 wherein each $R^1$ is independently an unsubstituted phenyl group or an unsubstituted aralkyl group.

4. The composition of claim 1 wherein each $R^3$ is independently an unsubstituted phenyl group or an unsubstitued aralkyl group.

5. The process of claim 2 wherein each $R^{1'}$ is independently an unsubstituted phenyl group or an unsubstituted aralkyl group.

6. The process of claim 1 wherein each $R^{3'}$ is independently an unsubstituted phenyl group or an unsubstitued aralkyl group.

7. The halogenated epoxy composition of claim 1 represented by the formula (I), wherein G is a glycidyl group, X is a chlorine or bromine atom, $R^1$ is a methyl group, $R^3$ is a hydrogen atom, p is an integer of 1 or 2, $q^1$ is an integer of 0 to 2, and n is a number of 0 to 5 on average.

8. The process of claim 2 wherein X' is a chlorine or bromine atom, $R^{1'}$ is a methyl group, $R^{3'}$ is a hydrogen atom, p' is an integer of 1 or 2, $q^{1'}$ is an integer of 0 to 2, and n' is a number of 0 to 5 on average.

9. The process of claim 2 wherein the halogenated polyhydric phenol composition is produced from reacting a phenolic compound and an aldehyde or ketone in a mole ratio of 1:0.1 to 1:1.

10. The process of claim 2 wherein 3–20 mol of epihalohydrin and 1–2 mol of alkali metal hydroxide are added per mol of phenolic hydroxyl groups of the halogenated polyhydric phenol composition.

11. A flame-retarded epoxy resin composition comprising (a) a halogenated epoxy resin composition of claim 1 and (b) a curing agent.

12. The flame-retarded epoxy resin composition of claim 11 wherein the amount of the halogenated epoxy composition is such that halogen accounts for 1–20 wt % of the total organic ingredients in the composition.

13. A flame-retarded epoxy resin composition for semiconductor encapsulation comprising (a) a halogenated epoxy resin composition of claim 1, (b) a curing agent, (c) an inorganic filler, and (d) a cure accelerator.

* * * * *